UNITED STATES PATENT OFFICE.

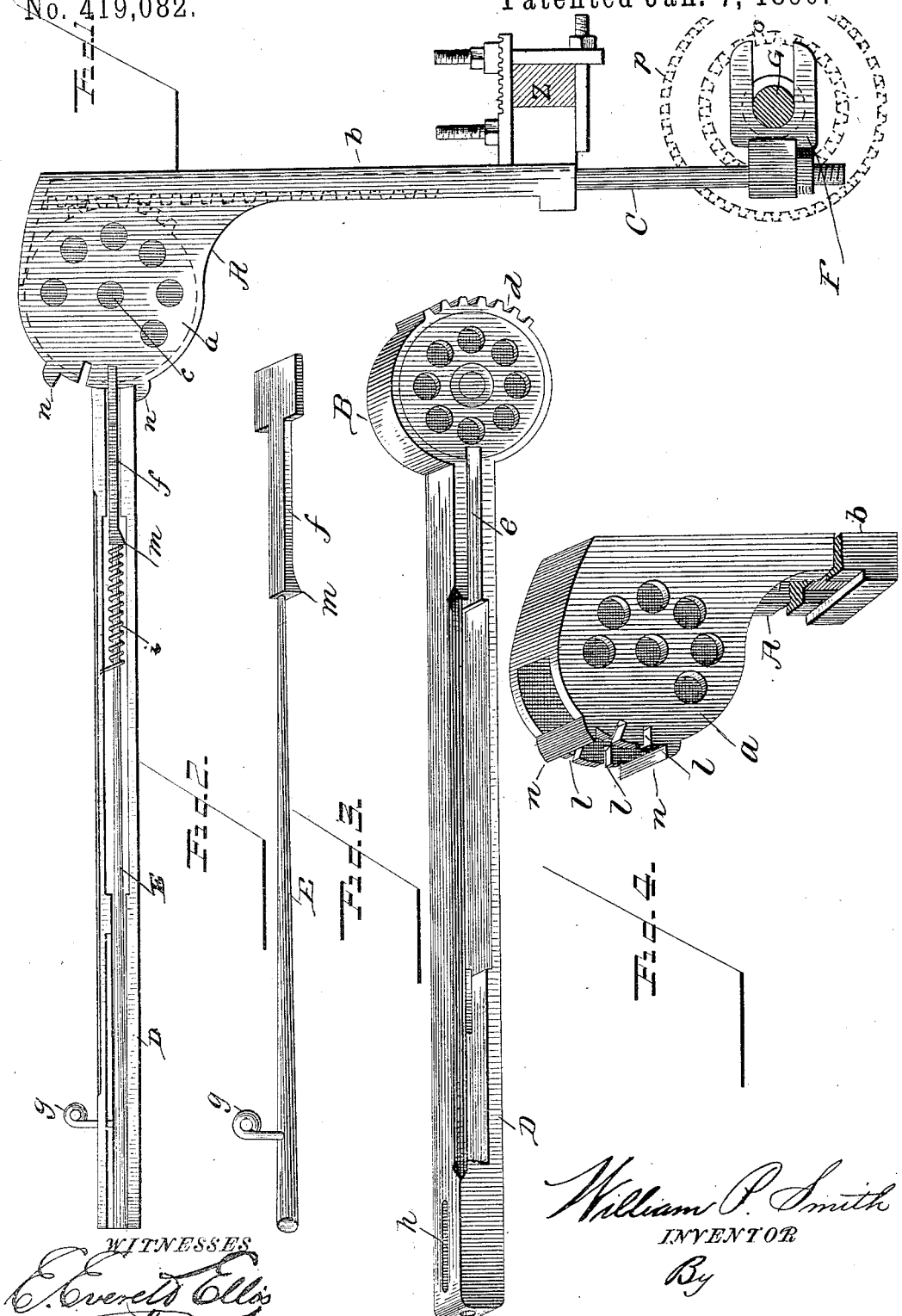

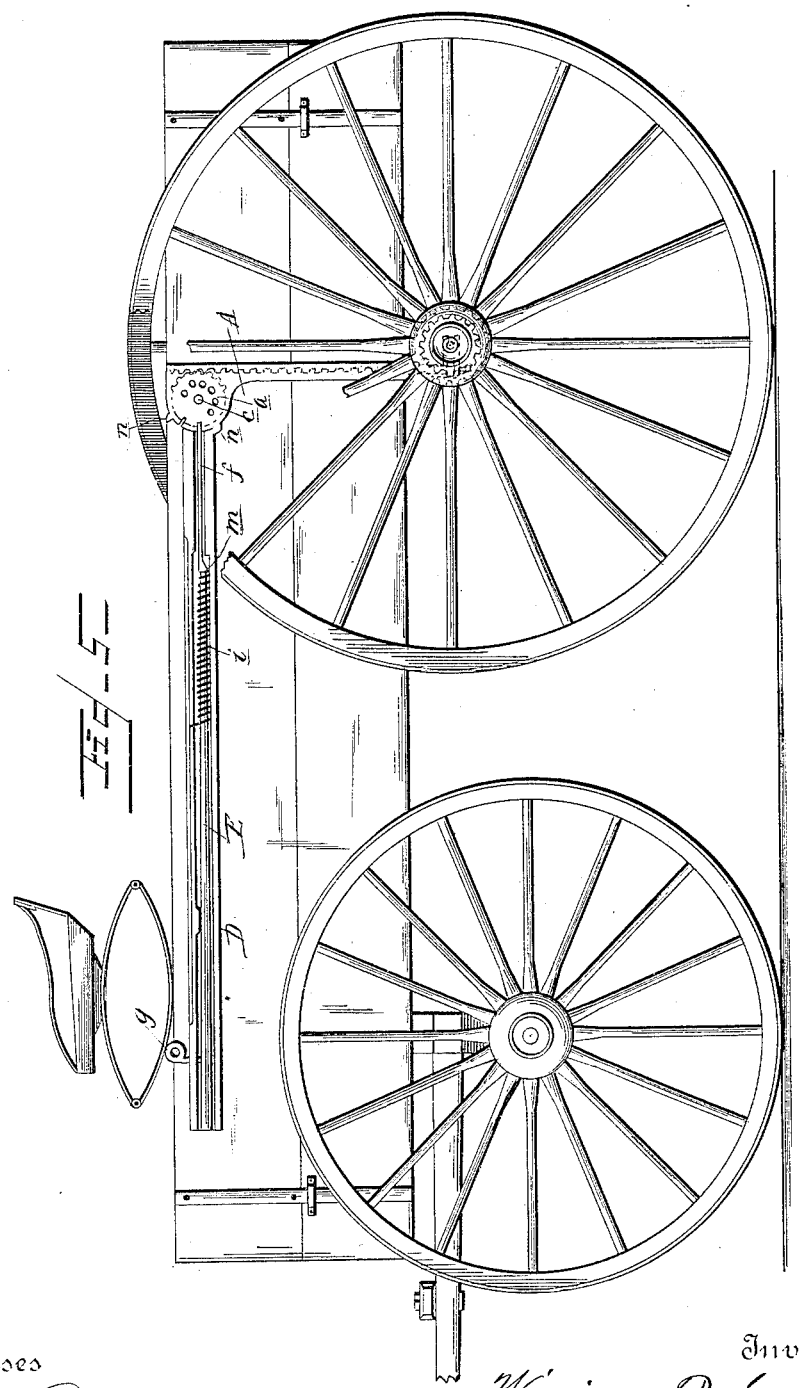

WILLIAM P. SMITH, OF RENTON, WASHINGTON.

HORSE-CHECKING DEVICE.

SPECIFICATION forming part of Letters Patent No. 419,082, dated January 7, 1890.

Application filed April 16, 1889. Serial No. 307,415. (No model.)

*To all whom it may concern:*

Be it known that I, WILLIAM P. SMITH, a citizen of the United States, residing at Renton, in the county of King and Territory of Washington, have invented certain new and useful Improvements in Horse-Checking Devices; and I do hereby declare the following to be a full, clear, and exact description of the invention, such as will enable others skilled in the art to which it appertains to make and use the same.

This invention relates to certain new and useful improvements in devices for preventing horses from running away while hitched to vehicles; and it consists, substantially, in such features of construction, arrangement, and combinations of parts as will hereinafter be more particularly described and claimed.

The invention is intended as an improvement upon the invention for which Letters Patent were granted me on the 19th of March, 1889, and numbered 399,708, and wherein a movable shaft is operated at will to fall into gear with a ring surrounding the hub of one of the vehicle-wheels, thereby setting the devices in operative condition. The result of the construction of devices resorted to is that should the horse attempt to run away the shaft will be rotated, and as it rotates it winds up a strap or rein reaching to the mouth of the horse, and consequently the harder the horse tries to run the stronger the pull or check exerted to his mouth.

The object of the present invention is to improve upon the mechanism for operating the movable shaft so as to greatly cheapen the cost, and also to render the same much easier to operate and more effective in its results, all as will more fully hereinafter appear when taken in connection with the accompanying drawings, wherein—

Figure 1 represents a longitudinal side elevation of my improvements, and Fig. 2 is a view in perspective of the locking bolt or rod. Fig. 3 is a perspective view of the combined cam and lever for raising and lowering the rack-bar, which supports the axle around which the check rain or strap is wound. Fig. 4 is also a perspective view representing in detail the bracket in which the rack-bar works, and in which is received the cam for operating said rack-bar. Fig. 5 represents a side view of a wagon having my improvements embodied in connection therewith.

In carrying my present invention into effect I resort to a bracket that is secured in any suitable manner to the side of the vehicle, preferably at a point or position near to the rear wheels, the said bracket being hollow and formed with an enlarged upper portion to receive the operating-cam, and a vertical straight portion to receive the vertically-moving rack-bar. A pin passes through said enlarged portion of the bracket centrally, and it is on this pin that the cam turns when it is moved by the lever formed therewith, and which lever is of a length to extend to the seat of the driver, so as to be under the driver's control.

The combined cam and lever are hollow for the purpose of lightness, and working within the lever longitudinally is a rod, to the rear end of which is formed a flat tongue that enters notches formed in the edges of the bracket, so as to lock the rack-bar to either of the positions to which it may be brought, the action of such rod being entirely automatic. The cam is toothed on a portion of its periphery to engage the rack-bar, and it may be here stated that the rack-bar supports the movable shaft of my former patent referred to by means of a hanger, substantially the same as before.

Reference being had to the several parts of the drawings by the letters marked thereon, A represents the hollow bracket that is formed with the enlarged upper portion $a$ and the vertical portion $b$, the cam B being received into said portion $a$, as shown, and working on a pin or rivet $c$, passing through the two centrally, while in the vertical portion $b$ is seen the vertically-moving rack-bar C, which is engaged by the teeth $d$ of the cam.

D represents a hollow lever, which is integral with the cam and which is formed at its rearward portion with a straight channel or guide $e$, in which works the flat tongue $f$, that is formed with the rod E, which works in the lever longitudinally, the forward end of said rod being provided with a handle $g$, passing through a slot $h$ in the rod D near its forward end. Surrounding the rod E within the lever is a spring $i$, the tendency of which is to force or press the tongue $f$ of said rod into the notches $l$ in the edges of the portion $a$ of the bracket A, the said spring having its bearing at one end in the side of the lever, and at its other end against the shoulder $m$ of the tongue portion of the rod. Above and below the series of notches $l$ in the bracket A is a stop $n$, by which the raising or lowering of the lever D is limited in extent, as will be clearly obvious from the drawings.

F represents the hanger supported by the rack-bar near its lower end, and in which is held the shaft G, that is caused to be raised or lowered, so as to have the pinion $o$ thereon (shown in dotted lines) engage with the teeth of the ring $p$, (also shown in dotted lines.)

Z represents the rear axle of a vehicle, which, as shown in Fig. 1, is supported by a suitable bracket, and which bracket is intended to be secured to the under side of the body of the vehicle by means of screws and nuts, also as shown. This bracket may or may not, as desired, form an integral part of the vertical portion $b$ of the hollow bracket A.

The operation of my invention is as follows: By grasping the handle $g$ of the rod E and drawing said rod forward against the action of spring $i$ the tongue $f$ of said rod is withdrawn from the notches $l$ in the edges of the portion $a$ of the bracket, and then is the lever D permitted to be raised or lowered, according as may be desired. By raising the lever the cam B operates to lower the rack-bar, and thus is the shaft G lowered to cause engagement of the pinion and ring by which the said shaft will be rotated, and the rein or strap, supposed to connect with the mouth of the horse, will be wound up and exert such a strain as to absolutely prevent the animal from going. To reverse the parts the rod E is again drawn outward to release the tongue $f$, and the lever D is lowered until the shaft has been lifted out of gear through the medium of the rack-bar and cam, whereupon the rod E is released and the tongue is forced automatically into the notches by the action of spring $i$, and the several parts thus locked in position.

I have herein shown certain details in the construction of the several parts; but it will be understood that immaterial changes therein could be resorted to, and consequently I do not wish to be understood as confining myself strictly thereto.

Having thus described my invention, what I claim as new, and desire to secure by Letters Patent, is—

1. In a horse-checking device, the hollow bracket A, constructed of the enlarged upper portion $a$ and vertical portion $b$ and formed with the notches $l$, in combination with the rack-bar working in said vertical portion, and means for raising and lowering said rack-bar, substantially as described.

2. In a horse-checking device, the hollow bracket A, constructed of the enlarged upper portion $a$ and vertical portion $b$ and formed with the notches $l$ and stop-projections $n$, in combination with the rack-bar working in said vertical portion, and means for raising and lowering said bar and locking it in its elevated position, substantially as described.

3. In a horse-checking device, the rack-bar C, the cam and hollow lever integrally combined, in combination with means for supporting said cam and lever, the said cam being formed with teeth on a part of its periphery adapted to engage the teeth of the rack-bar, substantially as shown, and for the purpose set forth.

4. In a horse-checking device, the combination, with the rotating shaft and vertically-moving rack-bar, of the hollow bracket A, in which said rack-bar works, the cam and hollow lever integrally combined and pivoted in the bracket, and the spring-operated rod working in said lever and formed with the tongue which enters the notches of the bracket, substantially as described.

In testimony whereof I affix my signature in presence of two witnesses.

WILLIAM P. SMITH.

Witnesses:
JOHN HALEY,
HENRY H. MEEKER.